United States Patent [19]

Gipser

[11] Patent Number: 5,443,282
[45] Date of Patent: Aug. 22, 1995

[54] ACTIVE WHEEL SUPPORTING SYSTEM FOR VEHICLES

[75] Inventor: Michael Gipser, Esslingen, Germany

[73] Assignee: Mercedes-Benz AG, Germany

[21] Appl. No.: 237,097

[22] Filed: May 3, 1994

[30] Foreign Application Priority Data

May 3, 1993 [DE] Germany .......... 43 14 516.7

[51] Int. Cl.⁶ .............................................. B60G 3/00
[52] U.S. Cl. .................... 280/690; 280/707; 188/378
[58] Field of Search ............. 280/688, 690, 692, 707; 188/378, 379

[56] References Cited

U.S. PATENT DOCUMENTS

| | | | |
|---|---|---|---|
| 4,360,087 | 11/1982 | Curwen | 188/379 |
| 4,483,425 | 11/1984 | Newman | 188/378 |
| 4,518,169 | 5/1985 | Kuroki et al. | 280/840 |
| 4,960,290 | 10/1990 | Bose | 280/692 |

FOREIGN PATENT DOCUMENTS

| | | | |
|---|---|---|---|
| 49228 | 4/1889 | Germany . | |
| 519996 | 2/1931 | Germany . | |
| 735806 | 5/1943 | Germany . | |
| 739058 | 9/1943 | Germany . | |
| 1269902 | 6/1968 | Germany . | |
| 1210712 | 10/1970 | Germany . | |
| 3002765A1 | 7/1981 | Germany . | |
| 3821386A1 | 12/1989 | Germany . | |
| 4037223A1 | 10/1991 | Germany . | |
| 3286040 | 12/1991 | Japan | 188/380 |
| 0920586 | 3/1963 | United Kingdom | 188/379 |
| 0947518 | 7/1982 | U.S.S.R. | 188/380 |
| 1634864 | 3/1991 | U.S.S.R. | 188/379 |

*Primary Examiner*—Karin L. Tyson
*Assistant Examiner*—Paul N. Dickson
*Attorney, Agent, or Firm*—Evenson, McKeown, Edwards & Lenahan

[57] ABSTRACT

The invention relates to an active wheel supporting system for vehicles having a scanning device which registers surface unevenness in a roadway, and active wheel support assemblies which are controlled by the scanning device so that the wheels are actively adjusted to the registered surface unevenness. To avoid acceleration of the vehicle body, wheel support assemblies are coupled in each case to counter-masses which carry out movements opposite to the wheel movements relative to the vehicle body. The reaction forces exerted on the body by the wheel movements are thus compensated by reaction forces directed in the opposite direction due to the simultaneous movement of the counter-masses.

4 Claims, 1 Drawing Sheet

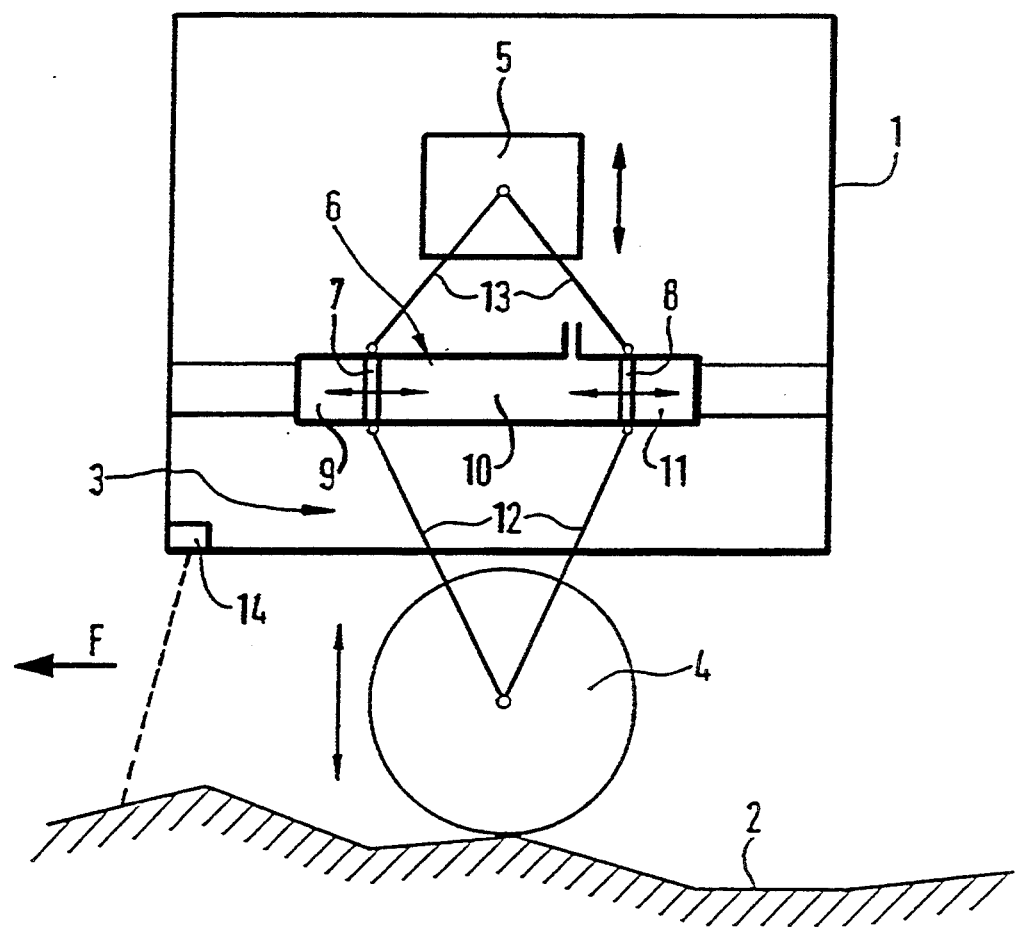

ACTIVE WHEEL SUPPORTING SYSTEM FOR VEHICLES

BACKGROUND AND SUMMARY OF THE INVENTION

The invention relates to an active wheel supporting system for vehicles having a scanning device which detects surface unevenness in a roadway, and active wheel support assemblies which can be controlled by the scanning device to compensate for surface unevenness detected while the vehicle is travelling.

German Patent Document DE-B 1,269,902 discloses a system of this type, for example, in which the roadway is scanned by means of a measuring beam. Deviation of the actual roadway compared to an assumed virtual roadway is determined by the measuring beam, and converted in direction and size to an adjustment of the wheel support assemblies, so that wheel movements are no longer simply a reaction to unevenness in the roadway, but rather a centrally precontrolled, intended avoidance or adjustment movement.

A similar system is the subject matter of German Patent Document DE-A 3,002,765 in which the tires can be inflated to be significantly harder without reducing comfort. Accordingly, the rolling resistance of the wheels can be reduced considerably.

Another wheel support system is disclosed in German Patent Document DE-05 40:37223, in which active support assemblies are arranged, on the one hand, between the wheels (or the axles) and the vehicle body and, on the other hand, between the wheels (or the axles) and absorption masses. It is this possible to damp both wheel movements and body movements independently of one another. The absorption masses, which can be adjusted rapidly relative to the wheels serve to reduce considerably dynamic wheel load fluctuations, and the impairment of driving safety and comfort associated therewith.

Practical tests have shown, however, that these systems do not yet operate satisfactorily.

It is therefore an object of the invention to provide a wheel support system which is comparatively simple to control, and has considerably improved operating characteristics.

This object is achieved by the wheel supporting system according to the invention, in which each wheel has a counter-mass coupled to the wheel support assembly. The counter-mass moves relative to the vehicle body in a direction opposite to that of the wheel, and compensates reaction forces associated with active wheel movements which forces act on the body.

The invention is based on the general concept of adjusting the wheels of a vehicle to previously scanned surface unevenness and, during the adjustment movements of the wheels, compensating the inevitable reaction forces between the wheels and the vehicle body by means of counter-masses guided in the opposite direction to the wheels. The vehicle body is thus kept free, to the greatest extent, from external forces caused by unevenness in the road.

In support assemblies which react sufficiently rapidly, the wheels can be adjusted virtually exactly to the surface unevenness without a simultaneous acceleration of the vehicle body due to the readjustment movements of the wheels.

According to a preferred embodiment of the invention, the counter-mass is smaller than the mass of the wheel (and the wheel guiding elements which move with it), and the drive coupling operates with a path transmission which compensates the difference in mass, such that the reaction forces exerted on the body by the wheel (and the parts connected thereto), on the one hand, and by the counter-mass, on the other hand, are mutually compensated.

If appropriate, the magnitude of the counter-mass and/or the size of the path transmission can be variable in order to adapt to different wheel masses.

Other objects, advantages and novel features of the present invention will become apparent from the following detailed description of the invention when considered in conjunction with the accompanying drawing.

BRIEF DESCRIPTION OF THE DRAWING

The single FIGURE shows a diagrammatic illustration of a wheel support assembly according to the invention.

DETAILED DESCRIPTION OF THE DRAWING

Referring to the drawing, a scanning device 14 is arranged on the vehicle body 1 which is illustrated only diagrammatically. The scanning device determines the profile and unevenness in a roadway 2 ahead of the vehicle in the travelling direction F.

The vehicle body 1 is connected via active wheel support assemblies (indicated generally by reference numeral 3) to the vehicle wheels 4. (Only a single wheel 4 is illustrated for reasons of simplicity.) The wheel support assemblies 3 are controlled as a function of the signals of the scanner 14 such that each wheel 4 is adjusted as precisely as possible to the unevenness in the roadway 2.

In order to avoid effects on the vehicle body 1 due to adjustment movements of the wheels 4, each wheel 4 is assigned a counter-mass 5 coupled to the wheel support assembly 3 so that the wheel 4 and the associated counter-mass 5 carry out in-phase movements in opposite directions to one another relative to the vehicle body 1. In this manner, during adjustment movements of the wheel 4, reaction forces exerted on the vehicle body 1 by the wheel 4 are compensated by counter-forces of the counter-mass 5.

The mass of the wheel 4 and that of the counter-mass 5 can be unequal if the movement strokes of the wheel and the counter-mass are correspondingly different. (That is, the product of the wheel mass and the length of the stroke path of the wheel 4 must be approximately equal to the product of the counter-mass 5 and the length of the stroke path of the counter-mass 5, the two products having opposite preceding signs because the stroke paths of the wheel 4 and counter-mass 5 are directed oppositely to one another.)

A suitable wheel support assembly 3 is illustrated diagrammatically in the drawing. It comprises a pneumatic cylinder 6 which is subdivided by two pistons 7 and 8 into three chambers 9, 10 and 11. In the example illustrated, the outer chambers 9 and 11 are completely closed off towards the outside, whereas the middle chamber 10 can be pressurized by a pneumatic pressure medium provided by pneumatic pressure source (not illustrated) or can be relieved from the pneumatic pressure via valves (not illustrated). Depending on the magnitude of the pneumatic pressure in the middle chamber 10, the pistons 7 and 8 are moved closer to, or farther from, one another.

The pistons 7 and 8 are connected to the wheel 4 by means of a toggle-like linkage arrangement 12. That is, the wheel 4 moves upward relative to the vehicle body 1 when the pistons 7 and 8 move away from one another; when the pistons 7 and 8 approach one another, the wheel 4 moves downward relative to the vehicle body 1.

The counter-mass 5 is also-coupled to the pistons 7 and 8 by means of a toggle-like linkage 13 in basically the same manner as the wheel 4, but on the side of the pneumatic cylinder 6 opposite the wheel 4. Thus, as shown in the FIGURE, the respective linkages 12, 13 and the pistons 7, 8 cooperate to provide a drive coupling which causes the wheel 4 and the counter-mass 5 to carry out movements relative to the vehicle body 1 which are directed oppositely one another.

In the example illustrated, the masses of the wheel 4 and counter-mass 5 are different, and the linkages 12 and 13 are dimensioned accordingly so that the counter-mass 5, which is relatively small compared to the mass of the wheel 4, always carries out a stroke which is large compared to that of the wheel 4. If the wheel 4 is moved actively relative to the vehicle body by changing the pressure in the chamber 10 as described previously, the counter-mass 5 carries out a corresponding movement in the opposite direction so that the dynamic movement forces exerted on the vehicle body by the wheel 4 and the counter-mass 5 are mutually compensated.

In the active wheel supporting system according to the invention, the active wheel movements caused by adjustment of the active wheel support assembly 3 relative to the vehicle body 1 generate no appreciable acceleration of the vehicle body 1. That is, if the wheel 4 is adjusted exactly to conform to the surface unevenness, essentially only a static supporting force acts as an external force on the vehicle body 1, while the dynamic forces caused by active wheel movements are compensated by opposing dynamic forces, from the counter-mass 5, and can only lead to internal forces.

If appropriate, the pneumatic pressure in the chambers 9 and 11 can also be varied in order to vary the mean ground clearance of the vehicle or compensate for a different payload of the vehicle body 1.

Differing from the design described above, the cylinder 6 may also be a hydropneumatic assembly which is subdivided by the pistons 7 and 8 into two outer pneumatic chambers 9 and 11 and one middle hydraulic chamber 10 which can be connected to a hydraulic pressure source or a relatively pressureless hydraulic reservoir.

If appropriate, all the chambers 9 to 11 can also be designed as hydraulic chambers, in which case, to adjust the wheel 4 relative to the vehicle body 1, each of the outer chambers 9 and 11 is connected to the hydraulic pressure source (or the reservoir) and the middle chamber 10 is connected to the reservoir (or the pressure source.)

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Active wheel supporting arrangement for a vehicle of the type having a scanning device which detects unevenness in a vehicle operating surface, and a wheel supporting assembly controlled to actively adjust to said unevenness in response to an output from a scanner while the vehicle is travelling, said suspension arrangement comprising:

a counter-mass; and
   a drive coupling arrangement adjustably connected between said counter-mass, said vehicle body and at least one wheel of said vehicle, which drive coupling causes said counter-mass to move in a direction opposite to that of the wheel relative to the vehicle body, and compensates reaction forces generated by active adjustment of said wheel supporting assembly.

2. Active wheel supporting system according to claim 1, wherein the counter-mass is smaller than the mass of said at least one wheel, and said drive coupling causes said counter-mass to move along a path which has a greater length than a path followed by said wheel, whereby a difference in mass between said counter-mass and said wheel is compensated.

3. Active wheel supporting system according to claim 1 wherein one of the path followed by said counter-mass and the path followed by said wheel is variable for adaptation to different wheel masses.

4. Active wheel supporting system according to claim 2 wherein one of the mass of said counter-mass and the length of the respective paths followed by said counter-mass and said wheel is variable for adaptation to different wheel masses.

* * * * *